United States Patent Office

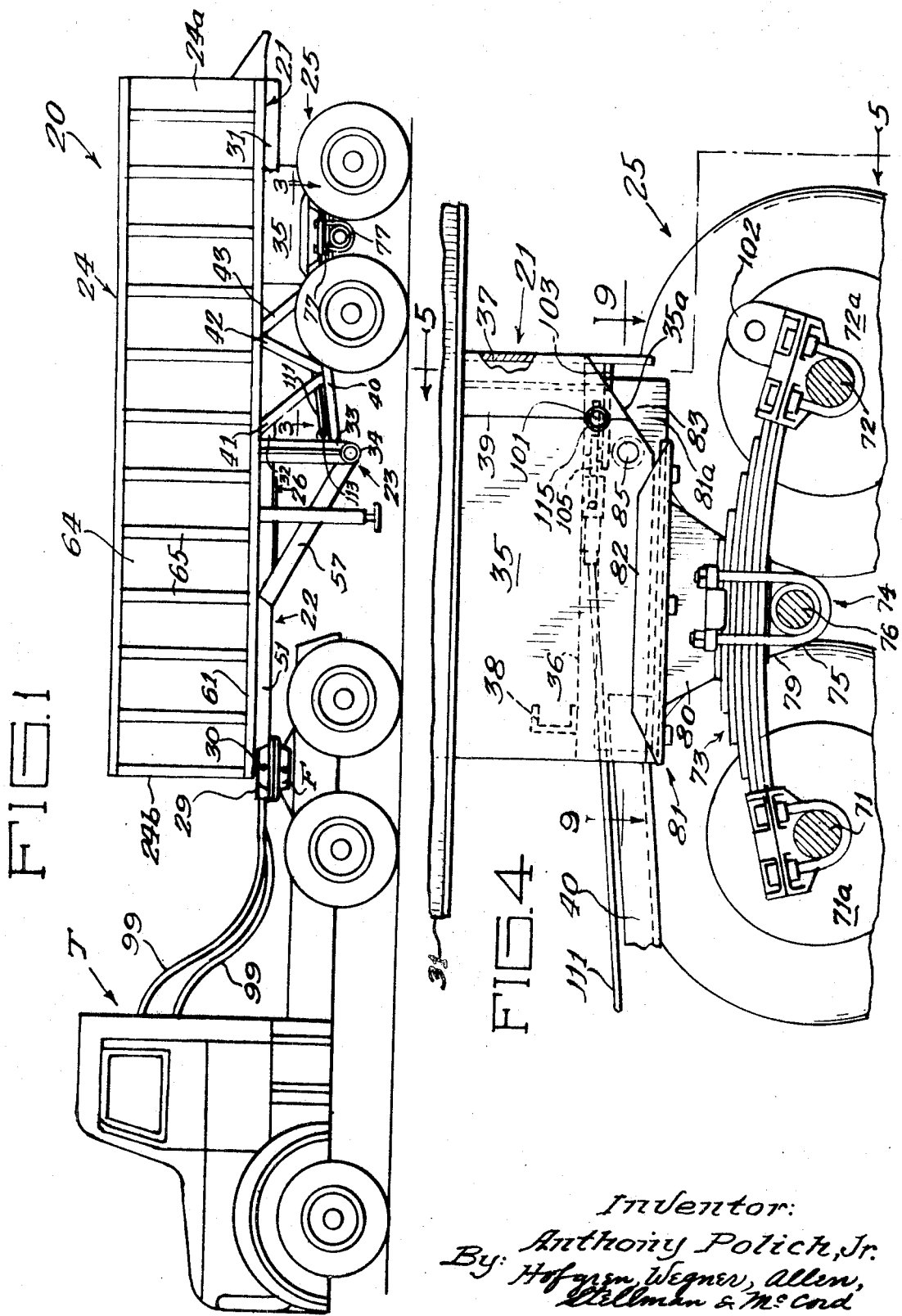

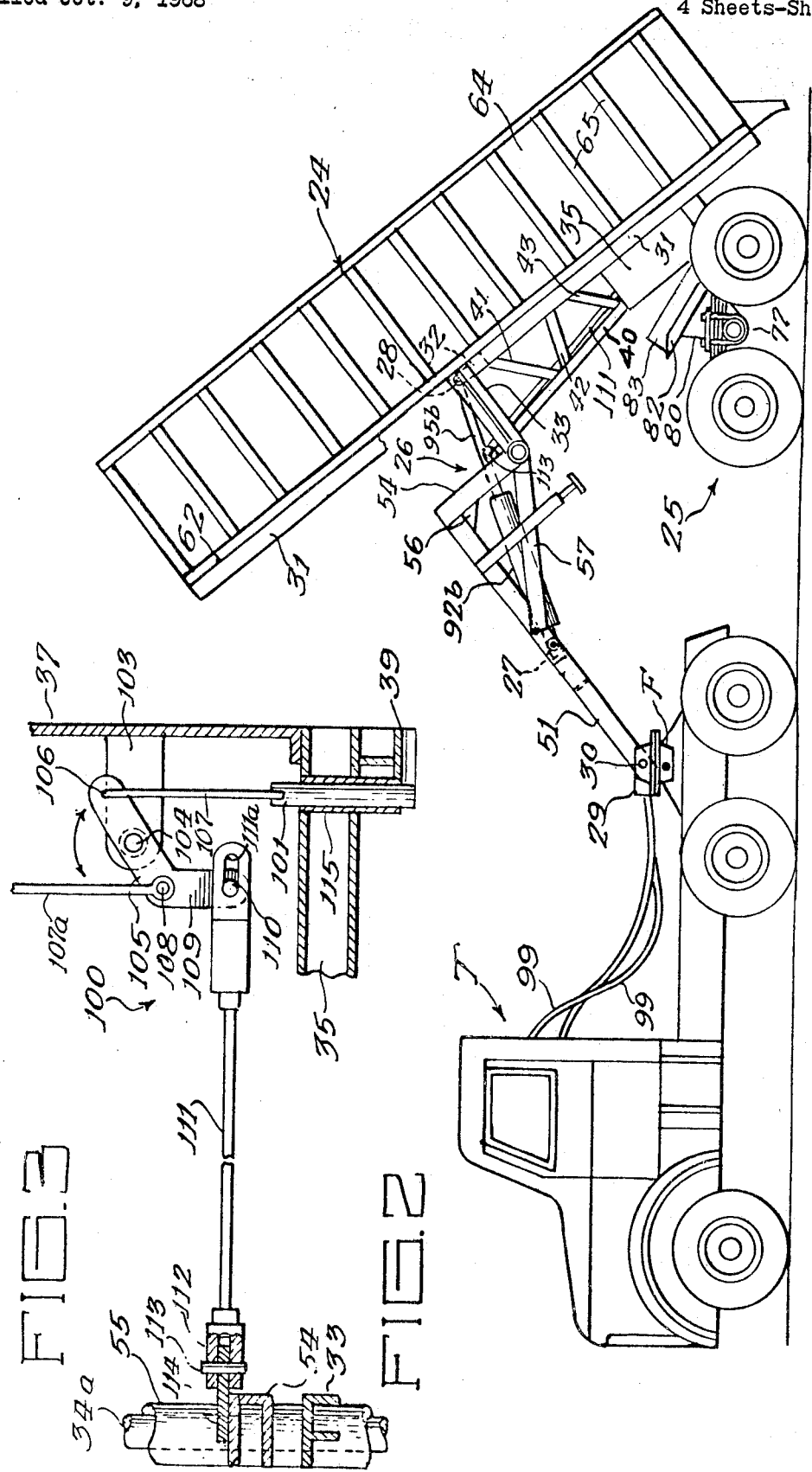

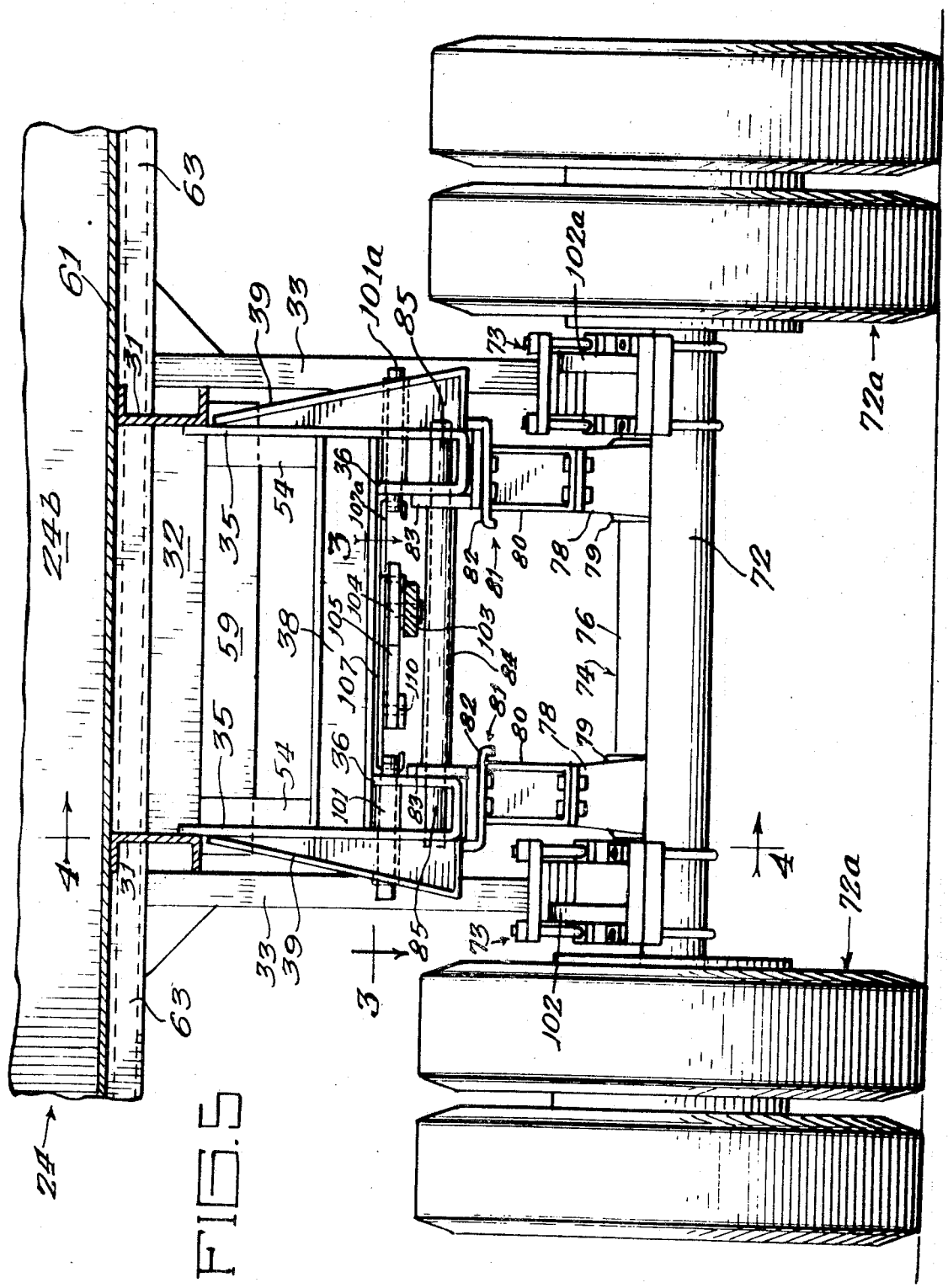

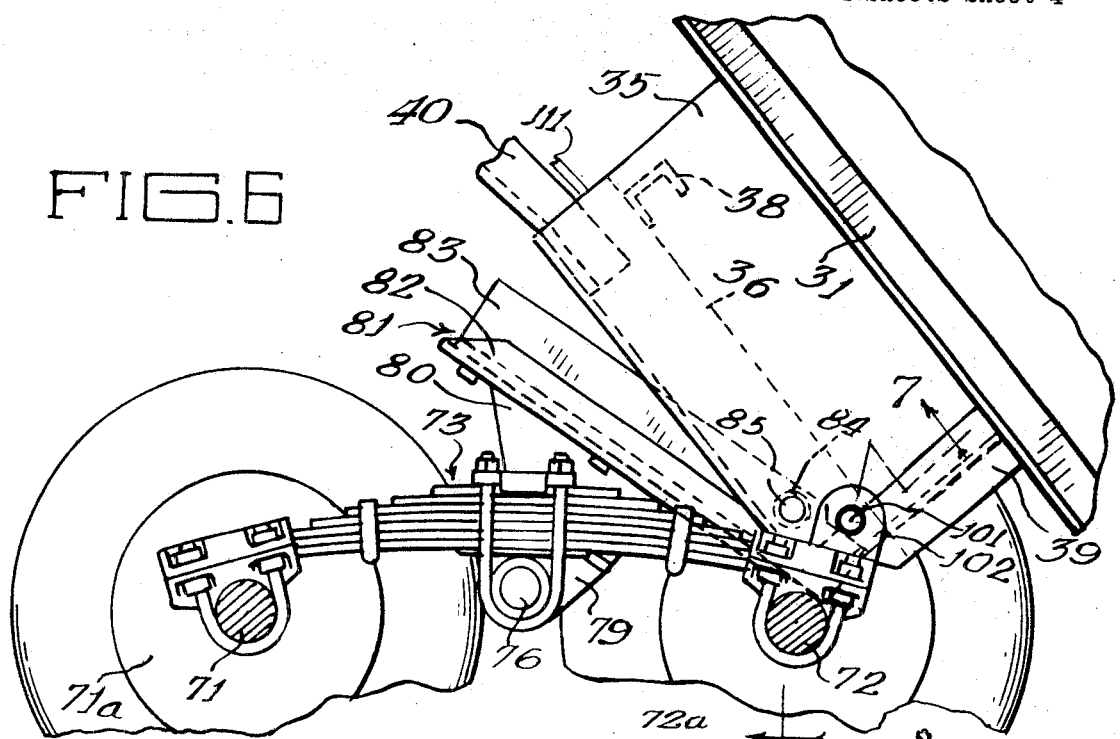
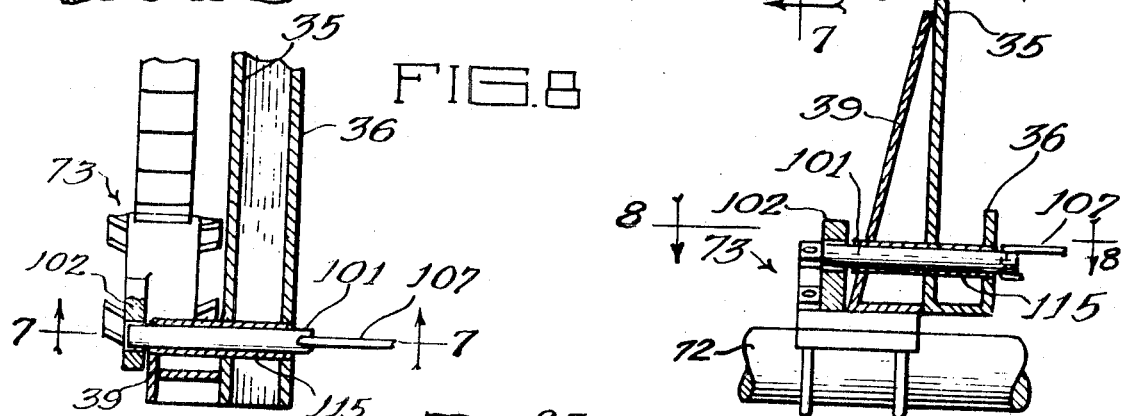
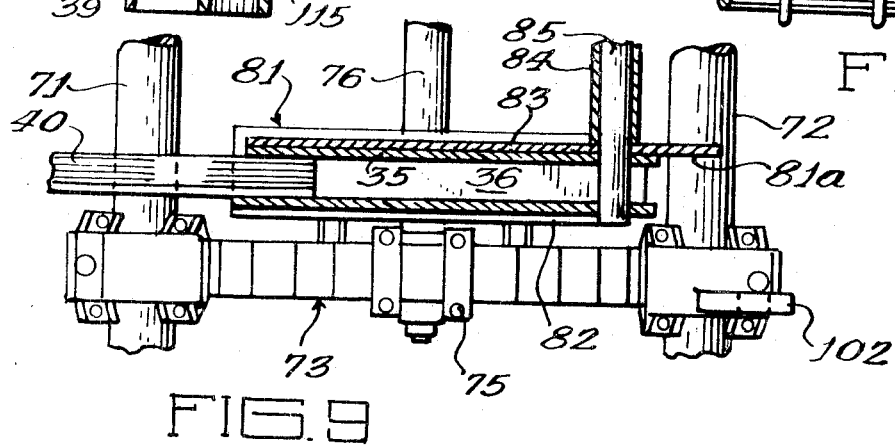

3,512,836
Patented May 19, 1970

---

3,512,836
LATERAL STABILIZING MEANS FOR A SEMI-TRAILER DUMP BODY
Anthony Polich, Jr., 8746 40th St.,
Lyons, Ill. 60534
Filed Oct. 9, 1968, Ser. No. 766,051
Int. Cl. B60p 1/18
U.S. Cl. 298—17      7 Claims

ABSTRACT OF THE DISCLOSURE

A semi-trailer dump body construction in which the dump body supporting frame and the rear axle assembly are provided with releasable interengaging means which automatically engage as the dump body approaches full dump position, so as to laterally stabilize the body in that position, and which automatically release at the beginning of movement of the dump body toward travel position.

---

CROSS REFERENCE TO RELATED APPLICATION

The dump body structure, and in particular the means for moving the dump body between horizontal travel position and dump position, and the means for pivotally mounting the dump body on the rear axle assembly, as described in this application, are disclosed and claimed in my copending U.S. patent application Ser. No. 766,052 filed Oct. 9, 1968.

BACKGROUND OF THE INVENTION

One hazard in the use of semi-trailer dump bodies at construction sites is that the ground of a construction site may contain soft spots in which one side of the semi-trailer rear axle assembly can sink below the other side, and the sinking movement is often accelerated as the dump body is moved toward dump position because of the shift in center of weight toward the rear axle assembly as the body moves toward dump position. Often such soft spots are not apparent to the tractor driver, who is unaware that one side of the semi-trailer rear axle assembly is in a soft spot until dumping has been started. In some situations the sinking of one side of the rear axle assembly is sufficient to permit the entire dump body to capsize as the sinking of the wheels on one side lifts the other side of the dump body by pulling up on the springs on the side which is on hard ground.

To the best of my knowledge, prior art semi-trailer dump body structures lack any means for laterally stabilizing the dump body in dump position so as to prevent capsizing of the dump body.

SUMMARY OF THE INVENTION

In accordance with the present invention, the rear of the dump body and main frame are stabilized to prevent undesirable side tilting in dump position by interengaging means on the rear of the main frame and the rear axle assembly which automatically interengage as the unit moves into dump position and automatically disengage as the unit moves away from dump position.

The principal object of the present invention, therefore, is to stabilize a dump body structure in dump position so as to prevent possible capsizing of the dump body.

Another object of the invention is to provide stabilizing mechanism which is automatically engaged as the dump body moves into full dump position, and which is automatically disengaged as the dump body starts back toward horizontal travel position.

Yet another object of the invention is to provide such a stabilizing means which consists of a simple mechanical linkage system which is operated by the jackknifing of a dump body support frame during movement of the dump body to and from dump position.

DESCRIPTION OF THE DRAWINGS

FIG. 1 is a side elevational view of a tractor to which is attached a tandem wheel semi-trailer dump body structure embodying the invention, the body being illustrated in horizontal or travel position;

FIG. 2 is a view like FIG. 1 with the structure illustrated in dump position;

FIG. 3 is a fragmentary broken sectional view on an enlarged scale taken substantially as indicated along the line 3—3 of FIG. 1 or FIG. 5;

FIG. 4 is a fragmentary side elevational view of the rear of the main frame and the tandem rear axle assembly, illustrating part of the stabilizing mechanism of the present invention;

FIG. 5 is a fragmentary section taken substantially as indicated along the line 5—5 of FIG. 4;

FIG. 6 is a view similar to FIG. 4 showing the structure in dump position;

FIG. 7 is a fragmentary section taken substantially as indicated along the line 7—7 of FIG. 6 and FIG. 8;

FIG. 8 is a fragmentary section taken substantially as indicated along the line 8—8 of FIG. 7; and FIG. 9 is a fragmentary section taken substantially as indicated along the line 9—9 of FIG. 4, illustrating the pivotal support of the main frame on the rocker assembly, with parts omitted for clarity.

DETAILED DESCRIPTION OF THE INVENTION

Referring to the drawings in detail, and referring first to FIGS. 1 and 2, the dump body structure of the present invention, indicated generally at 20, can be drawn by a conventional tractor T provided with a standard fifth wheel F. The structure of the invention includes a longitudinal main frame, indicated generally at 21; a longitudinal forward frame, indicated generally at 22 and connected to the main frame 21 by main pivot means 23; a dump body 24 which is secured to the main frame 21 and has its forward end extending a substantial distance forward of the main frame and supported in a horizontal, or travel position upon the forward frame 22; a rear axle assembly, indicated generally at 25, upon which the rear of the main frame 21 is supported; and extensible means, indicated generally at 26, consisting of a pair of identical hydraulic cylinder and piston units such as the unit 26a, which are pivoted to the forward frame at 27 and to the main frame at 28 across the main pivot means 23. At the front end of the forward frame 22 is a conventional kingpin unit 29 which locks onto the fifth wheel F for rotary movement in the conventional manner and is provided with transverse pivot means 30 by means of which it is connected to said forward frame 22.

The main frame 21 is best seen in FIGS. 1 and 5 to include a pair of parallel longitudinal channel beams 31 which extend from the rear end 24a of the dump body 24 and are connected adjacent their forward ends by a transverse box frame member 32. Immediately ahead of the box frame 32 a pair of channel arms 33 are welded to the longitudinal channel beams 31 perpendicular to the latter. At the lower ends of the arms 33, and forming part of the main pivot means 23, are hollow bosses 34 which support a transverse shaft 34a.

As best seen in FIGS. 4 and 5, at the rear of the main frame 21 is a pair of side plates 35 the upper ends of which are welded to the main channel beams 31, the plates 35 being perpendicular to the channel beams and having integral channel portions 36 at their lower ends. The side plates 35 are connected at their rear ends by a deep cross channel member 37 and their forward end portions are connected by a cross channel 38 which is welded to the plates 35 and to the bottom channel portions 36. The side plates 35 have their lower rear corners cut off as indicated at 35a, and the rear ends of the side plates 35 are reinforced by gussets 39.

Extending forwardly from the lower ends of the side plates 35 to the lower ends of the perpendicular arms 33 are inclined braces 40, and diagonal braces 41, 42 and 43 connect the inclined braces 40 with the longitudinal channel beams 31.

The forward longitudinal frame 22 is best seen in FIG. 2 to include a pair of parallel longitudinal beams 51 the front ends of which are bored to receive the pivot 30 which also impales flanges 29a of the kingpin unit 29 by means of which the forward frame 22 is connected to the fifth wheel F of the tractor T. At the rear ends of the beams 51 are channel arms 54 which are welded to the beams and are perpendicular to them. A tube 55 which is part of the main pivot 23 is journalled upon the shaft 34a and has its two ends welded to the arms 54 so as to provide a pivotal connection between the forward frame 22 and the main frame 21.

As best seen in FIG. 2, the longitudinal beams 51 of the forward frame and the arms 54 of that frame are reinforced by gusset plates 56 and diagonal braces 57, the latter of which connect the lower ends of the arms 54 to the beams 51. In addition, a cross member 59 is welded to the arms 54 and to the longitudinal beams 51.

The dump body 24 is of conventional construction, having a floor 61 the longitudinal margins of which have sills 62, and at intervals cross braces connect the sills to the longitudinal channel beams 31 of the main frame. In addition to the closed rear end 24a and the front end 24b, the dump body 24 includes parallel side walls 64 which are provided with upright braces 65 at intervals.

In addition to the cross braces 63, strengthening of the dump body floor 61 and stabilization of the entire dump body are provided by inclined braces 66 which connect the lower ends of the main frame perpendicular arms 33 to a pair of the cross braces 63 immediately adjacent the sills 62.

The structure of the tandem rear axle assembly 25 is generally conventional, and as best seen in FIGS. 4 and 5 it includes a forward axle 71 on which are journalled dual wheels 71a, a rearward axle 72 on which are journalled dual wheels 72a, leaf spring assemblies, indicated generally at 73, at the forward and rear ends of which the forward and rearward axles 71 and 72 are respectively mounted, and a central support assembly, indicated generally at 74. The central support assembly 74 includes U-bolts 75 by means of which a tubular cross arm 76 is suspended beneath the centers of the two leaf spring assemblies 73. A pair of mounting pedestals 77 have hubs 78 by which they are journalled on the tubular cross arm 76, and a pair of mounting blocks 79 surmount the pedestals 77. A pair of rocker members, indicated generally at 81, are interposed between the mounting blocks 79 and the beams 31. As best seen in FIGS. 4 to 9, the rocker members 81 include lower angles 82 and upper angles 83 which are bolted together facing in opposite directions, and as seen in FIG. 5 the channel-like lower ends 36 of the main frame side plates 35 are supported between the spaced upright arms of the oppositely facing angles 82 and 83. Welded between the angles 83 is a sleeve 84 which provides a journal for a shaft 85 the outer ends of which impale the two walls of the channel-like lower portion 36 of the main frame side plates 35 so as to pivotally support the main frame upon the rocker assembly 81. As best seen in FIG. 4, the shaft 85 is located a substantial distance to the rear of the tubular support arm 76, and only a short distance forward of a vertical plane through the rearward axle 72.

The extensible means 26, consisting of the identical hydraulic cylinder and piston units 26a, are mounted on the main frame 21 and the forward frame 22 by means which are described in detail in my previously-identified copending U.S. patent application, and are provided with conventional hydraulic supply hookups to both extend and retract the pistons under pressure, with control by means of valves in the cab of the tractor T as is well known in the art.

When the extensible means 26 is retracted the dump body structure 20 is in the travel position of FIG. 1, in which the entire forward portion of the dump body 24 is supported upon the means 51 of the forward frame 22. To elevate the dump body structure to dump position the hydraulic cylinder and piston units are simultaneously extended which causes the dump body structure to move toward the position of FIG. 2 by causing the main frame arms 33 and the front frame arms 54 to pivot relative to one another about the main pivot 23 in a jackknife action which elevates the front of the dump body and rocks the body into dump position. During this rocking movement the body pivots about two separate and longitudinally spaced pivot axes—i.e., the support arm 76 and the shaft 85. The structure and operation as described up to this point are those disclosed and claimed in my previously identified copending U.S. patent application.

The present invention constitutes means for laterally stabilizing the main frame and dump body in dump position, and is applicable to conventional semi-trailer dump body structures as well as to the particular structure heretofore described. To provide lateral stability in dump position, the rear of the main frame 21 and an unsprung portion of the rear axle assembly 25 are provided with an interlocking mechanism, indicated generally at 100, which is best seen in FIGS. 3, 4, 5, 7 and 8. The interlocking mechanism is so arranged that a pair of interlocking plungers 101 and 101a on opposite sides of the main frame and a pair of interlocking bosses 102 and 102a on opposite sides of the rear axle assembly 25 (see FIGS. 4 and 5) are automatically engaged as the main frame and dump body move into dump position. This is accomplished by a lever and linkage system, seen in FIG. 3, which will now be described.

A horizontal boss 103 on the forward face of the back channel 37 on the main frame 21 is provided with a pin 104 which is in a plane perpendicular to the plane of the coplanar dump body sills 62. Pivoted on the pin 104 is a lever 105 the rear end of which is pivotally connected at 106 to a push rod 107 which is connected to the interlocking plunger 101 and the front end of the lever 105 is pivotally connected at 108 to a push rod 107a which is connected to the plunger 101a, so that rotation of the lever 105 about the pivot 104 moves both plungers lengthwise. Integral with the lever 105 is a short arm member 109 which is pivoted at 110 in a slot 111a of an operating rod 111 that extends forward and has a bifurcated forward end 112 which makes a pivotal connection 113 with a bracket 114 upon one of the perpendicular arms 54 of the forward frame 22.

The plungers 101 and 101a are slidably mounted in sleeves 115 and 115a, respectively, which extend outwardly through the bracing webs 39 as seen in FIG. 5.

As seen in FIGS. 7 and 8, when the interlocking plungers 101 and 101a are extended their outer ends engage the openings in the hollow bosses 102 and 102a, respectively, so as to lock the dump body against transverse rocking movement either up or down with respect to the rear axle assembly 25. Extension of the plungers 101 and 101a occurs automatically as the dump body structure moves into dump position by the action of the lever 105 and operating linkage 109–111. The jackknifing action of the main frame 21 and forward frame 22 pulls the operating rod 111 toward the front, and the slot 111a provides a lost motion connection which causes the lever 105 to pivot clockwise as seen in FIG. 3 when the body has reached a predetermined position with the side plate surfaces 35a resting on the rear axle assembly as seen in FIG. 6. In this position the plungers 101 and 101a are aligned with the openings in the hollow bosses 102 and 102a, respectively; and rotation of the lever 105 extends the plungers 101 and 101a, so that they impale the openings in the hollow boses 102 and 102a. The opposite action of the operating rod 111 and lever 105 as the dump body returns toward travel position retracts the plungers 101 and 101a and disengages them from the hollow bosses 102 and 102a. When the plungers are engaged with the bosses they are, of course, locked against movement either up or down.

The foregoing detailed description is given for clearness of understanding only and no unnecessary limitations should be understood therefrom as modifications will be obvious to those skilled in the art.

I claim:

1. In a semi-trailer dump vehicle structure which has a tandem rear axle assembly that includes an unsprung portion comprising forward and rearward axles and wheels and springs on said unsprung portion, a semi-trailer dump body which has its rear end pivotally supported on said springs, and means for rocking said body relative to said rear axle assembly between a horizontal travel position and an inclined dump position during which rocking it pivots successively about two separate and longitudinally spaced transverse pivot axes, means for laterally stabilizing the rear of the dump body in dump position comprising, in combination; releasable interengaging means including first members on the dump body which are laterally extensible and retractable, and second members on the unsprung portion of the rear axle assembly; driving means on the dump vehicle which is operatively connected to the first members; and means operable during movement of the dump body between travel position and dump position for operating the driving means to extend said first members laterally into locking engagement with said second members after movement of the body to a preselected position with respect to said tandem rear axle assembly and for retracting said first members from such engagement during return movement of the body from dump position.

2. The combination of claim 1 in which the means for moving the driving means includes an element which is on a part of the structure that moves relative to the dump body during movement of the body between travel position and dump position.

3. The combination of claim 2 in which the driving means comprises a linkage system which is pivotally connected to the first members and includes an actuating member, and in which the means for moving the driving means is engaged with said actuating member to move the latter in one direction during movement of the dump body toward dump position and in the opposite direction during movement of the dump body from dump position.

4. The combination of claim 3 in which the linkage system includes a centrally pivoted lever, a link connecting each end of said lever to one of the first movable members, and a connection between the actuating member and said lever so that movement of the actuating member pivots the lever to simultaneously extend said first members during movement of the actuating link in one direction and simultaneously retract said first members during movement of the actuating link in the opposite direction.

5. The combination of claim 1 or claim 4 in which the first members comprise laterally movable plungers and the second members comprise hollow bosses which are impaled by said plungers.

6. In a semi-trailer dump vehicle structure for use with a tractor having a fifth wheel, in combination: a longitudinal main frame; a tandem rear axle assembly including an unsprung portion comprising forward and rearward axles and wheels, and springs on said unsprung portion which support the rear of said main frame; a dump body provided with generally coplanar longitudinal sills and supported on said main frame, said body having its forward portion extending a substantial distance forwardly of the front of the main frame; a longitudinal forward frame which supports the forward portion of the dump body in a horizontal travel position of the latter; means including a front transverse pivot for detachably mounting the front of the forward frame on a fifth wheel of a tractor; a main transverse pivot connecting the front end of the main frame and the rear end of the forward frame; extensible means pivotally connected to both said frames across said main pivot so that extension of said means elevates the adjacent ends of the frames and jackknifes them about the main pivot to rock the dump body to an inclined dump position; and releasable interengaging means including first members on the main frame which are laterally extensible and retractable and second members on the unsprung portion of the rear axle assembly, driving means on the main frame which is operatively connected to the first members, and means for moving said driving means which includes an element mounted on the forward frame so that the jackknife movement between the main frame and the forward frame moves the driving means to extend the first members into locking engagement with the second members after rocking movement of the body to a preselected position with respect to the tandem rear axle assembly and to retract the first members from engagement with the second members during return movement of the body from dump position.

7. The combination of claim 6 in which the driving means comprises a linkage system which is pivotally connected to the first members and includes an actuating link extending longitudinally of the main frame, and in which the means for moving the driving means comprises a pivotal connection between the actuating link and the forward frame.

References Cited

UNITED STATES PATENTS

| | | | |
|---|---|---|---|
| 1,610,881 | 12/1926 | Reinsch | 298—21 |
| 2,883,237 | 4/1959 | Schonrock | 298—17 |
| 3,027,197 | 3/1962 | Tripodi | 298—17 |
| 3,039,822 | 6/1962 | McManus | 298—17 |
| 3,083,059 | 3/1963 | Biszantz | 298—17 |

RICHARD J. JOHNSON, Primary Examiner

U.S. Cl. X.R.

298—22